United States Patent
Nakamura et al.

(10) Patent No.: US 7,361,698 B2
(45) Date of Patent: Apr. 22, 2008

(54) WATER-BASED PIGMENT INKS, IMAGE RECORDING METHOD, AND IMAGE RECORDING SYSTEM

(75) Inventors: Michiei Nakamura, Tokyo (JP); Naoyuki Sakai, Tokyo (JP); Hiroyuki Shimanaka, Tokyo (JP); Dai Watanabe, Tokyo (JP); Kenji Ogawa, Tokyo (JP); Yoshiyuki Zama, Tokyo (JP); Hisao Okamoto, Tokyo (JP); Atsushi Nogami, Tokyo (JP); Kazuo Kanou, Tokyo (JP); Tohru Hosoda, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 247 days.

(21) Appl. No.: 10/486,193

(22) PCT Filed: May 30, 2003

(86) PCT No.: PCT/JP03/06895

§ 371 (c)(1),
(2), (4) Date: Feb. 12, 2004

(87) PCT Pub. No.: WO03/102092

PCT Pub. Date: Dec. 11, 2003

(65) Prior Publication Data

US 2004/0198869 A1    Oct. 7, 2004

(30) Foreign Application Priority Data

May 31, 2002    (JP)    ............................. 2002-159487

(51) Int. Cl.
C08D 11/00    (2006.01)
(52) U.S. Cl. ...................................... 523/160; 523/161
(58) Field of Classification Search ................ 523/160, 523/161
See application file for complete search history.

(56) References Cited

U.S. PATENT DOCUMENTS

| | | | | |
|---|---|---|---|---|
| 3,271,347 A | * | 9/1966 | Aronoff et al. | 524/310 |
| 3,770,684 A | * | 11/1973 | Singer et al. | 524/306 |
| 4,597,794 A | | 7/1986 | Ohta et al. | |
| 4,713,411 A | | 12/1987 | Kanou et al. | |
| 5,221,334 A | | 6/1993 | Ma et al. | |
| 5,417,747 A | * | 5/1995 | Arata et al. | 106/31.68 |
| 5,571,850 A | * | 11/1996 | Ma et al. | 523/160 |
| 5,798,421 A | * | 8/1998 | Corpart et al. | 525/326.9 |
| 5,854,331 A | | 12/1998 | Ma et al. | |
| 5,889,083 A | * | 3/1999 | Zhu | 523/161 |
| 5,913,971 A | * | 6/1999 | Fujimatsu et al. | 106/31.86 |
| 5,913,972 A | | 6/1999 | Kanou et al. | |
| 5,932,630 A | * | 8/1999 | Kovacs et al. | 523/161 |
| 5,954,866 A | * | 9/1999 | Ohta et al. | 106/31.89 |
| 5,958,123 A | * | 9/1999 | De La Fuente | 106/31.69 |
| 5,977,209 A | * | 11/1999 | Breton et al. | 523/160 |
| 6,013,122 A | * | 1/2000 | Klitzman et al. | 106/31.03 |
| 6,040,358 A | * | 3/2000 | Page et al. | 523/161 |
| 6,171,381 B1 | * | 1/2001 | Yoshimura et al. | 106/31.6 |
| 6,245,832 B1 | | 6/2001 | Suzuki et al. | |
| 6,512,034 B1 | * | 1/2003 | Hamada et al. | 524/236 |
| 6,723,257 B2 | * | 4/2004 | Libutti et al. | 252/388 |
| 6,811,251 B2 | * | 11/2004 | Kinomoto et al. | 347/101 |
| 2001/0020062 A1 | | 9/2001 | Abuelyaman et al. | |

FOREIGN PATENT DOCUMENTS

| | | |
|---|---|---|
| EP | 0 722 994 A1 | 7/1996 |
| EP | 867484 | 9/1998 |
| EP | 1 270 680 A2 | 1/2003 |
| JP | 2001-187850 | 7/2001 |

* cited by examiner

*Primary Examiner*—Edward J. Cain
(74) *Attorney, Agent, or Firm*—Oblon, Spivak, McClelland, Maier & Neustadt, P.C.

(57) ABSTRACT

A water-based pigment ink contains a pigment, a hydrophilic dispersant, an aqueous medium, an alkali agent for solubilizing the hydrophilic dispersant in the aqueous medium, and a hydrophilic compound having at least one structural unit of "hydrophobic molecular chain-hydrophilic molecular chain-hydrophobic molecular chain" in a structure thereof. The water-based pigment ink is suited especially as an ink for ink-jet printers.

16 Claims, No Drawings

WATER-BASED PIGMENT INKS, IMAGE RECORDING METHOD, AND IMAGE RECORDING SYSTEM

TECHNICAL FIELD

This invention relates to water-based pigment inks, specifically to water-based pigment inks suited for ink-jet recording which performs recording by causing ink droplets to fly from a printer head, and more specifically to water-based pigment inks which upon forming images on recording media, especially plain paper, can form images good in chroma and density and excellent in print quality.

BACKGROUND ART

Ink-jet printers, owing to the development of models of higher performance, have been finding utility for a wide variety of applications, including personal applications, office applications, business applications, recording applications, color display applications and color photo applications. Concerning pigment inks, on the other hand, there is a move toward use of still smaller pigment particles in inks with a view to achieving improvements in pigment vividness, brightness, color density and the like. There is also a move toward smaller jetted droplets (ink droplets) in order to keep in step with the move toward higher printing speed and higher image quality by improvements in printers. These improvements have brought about high image quality for coated paper for ink-jet recording, especially for photographic paper and wide format paper but, when printed on non-coated paper called "plain paper", ink droplets penetrate into paper fibers, resulting in the development of a problem that the printing color density, in other words, the color developing property is lowered.

An object of the present invention is to provide a water-based pigment ink for use in ink-jet recording, which can form an image good in chroma and density and excellent in print quality even when printing is performed on plain paper.

DISCLOSURE OF THE INVENTION

The above-described object can be achieved by the present invention which will be described hereinafter. Described specifically, the present invention provides a water-based pigment ink characterized in that the water-based pigment ink comprises a pigment, a hydrophilic dispersant, an aqueous medium, an alkali agent for solubilizing the hydrophilic dispersant in the aqueous medium, and a hydrophilic compound having at least one structural unit of "hydrophobic molecular chain-hydrophilic molecular chain-hydrophobic molecular chain" in a structure thereof; an image recording method making use of the ink; and an image recording system with the ink loaded thereon.

Each of the hydrophobic molecular chains in the hydrophilic compound for use in the present invention may preferably be a hydrophobic molecular chain having a weight average molecular weight of from 70 to 10,000 and selected from a group consisting of aliphatic groups, alicyclic groups, aromatic hydrocarbon groups and heterocyclic compound groups and polyethers, polythioethers, polyesters, polyamides, polyurethanes and polyureas containing such hydrophobic groups. On the other hand, the hydrophilic molecular chain in the hydrophilic compound for use in the present invention may preferably be a hydrophilic molecular chain having a weight average molecular weight of from 500 to 100,000 and containing hydrophilic groups selected from a group consisting of nonionic hydrophilic groups selected from ether groups, hydroxyl groups or acid amide groups, anionic hydrophilic groups selected from carboxyl groups, sulfonic groups, sulfate ester groups, phosphate ester groups or groups of neutralized salts of such anionic hydrophilic groups, and cationic hydrophilic groups selected from primary to tertiary amino groups, quaternary ammonium groups, pyridinium groups or groups of neutralized salts of such cationic hydrophilic groups.

BEST MODES FOR CARRYING OUT THE INVENTION

The present invention will next be described in further detail by describing certain modes for carrying out the invention.

The water-based pigment ink according to the present invention is characterized in that it contains a pigment, a dispersant, an aqueous medium and a specific hydrophilic compound.

The specific hydrophilic compound which characterizes the present invention is a hydrophilic compound having in a structure thereof at least one structural unit of hydrophobic molecular chains and a hydrophilic molecular chain in the form of an "A-B-A" type block bond of "hydrophobic molecular chain-hydrophilic molecular chain-hydrophobic molecular chain". In the aqueous medium of the water-based pigment ink, the hydrophilic molecular chain in the "A-B-A" type hydrophilic compound progressively dissolves in the aqueous medium. However, the hydrophobic molecular chains bonded to the opposite ends of the hydrophilic molecular chain, respectively, do not dissolve in the aqueous medium, so that the hydrophobic molecular chains move closer toward each other.

The portions of the hydrophobic molecular chains, therefore, act as physical crosslinking points (flocculation points) for the dissolved hydrophilic molecular chain, and as a consequence, the "A-B-A" type hydrophilic compound forms a network structure. The "A-B-A" type hydrophilic compound, therefore, has a property to impart structural viscosity to the water-based pigment ink in which the hydrophilic compound has been incorporated, and functions as a structural viscosity forming agent.

To provide an image of the above-described water-based pigment ink with excellent chroma, density and scuff fastness, it is desired for particles of the pigment as a colorant to be secured without flocculation on a surface of a recording medium when the ink is fixed on the recording medium. As a result of an extensive investigation conducted by the present inventors, substantial improvements were observed in the chroma and density of resultant images when a hydrophilic compound having a hydrophobic-hydrophilic-hydrophobic structure is used in the ink composition according to the present invention.

As such advantageous effects were not brought about when a conventional pigment dispersant formed solely of "hydrophobic-hydrophilic" structural units was used, the hydrophilic compound is considered to act as will be described hereinafter. This compound is equipped with such property that, when it is dissolved in an ink medium, both of the hydrophobic molecular chains by which the hydrophilic molecular chain is flanked move closer toward each other to form a loose hydrophilic sol structure in which the hydrophobic molecular chains are bonded as physical crosslinking points in the form of a network.

Ink-jet printing (recording) is a printing method, in which by bubbles produced as a result of oscillation of a piezoelectric element or boiling of an ink, pressure waves are produced to make ink droplets fly such that printing is performed. By the pressure waves, the network structure in the ink is instantaneously destroyed so that the ink is readily delivered to fly as minute droplets. After striking a recording medium, the above-described compound in the ink again forms a loose hydrophilic network sol structure. The fluidity is lowered, so that the compound has an effect to suppress penetration of the ink into paper fibers. As a consequence, the pigment deposits on the recording medium so that sufficient color developing property (color density) can be obtained. In the case of a conventional dispersant formed solely of one or more "hydrophilic-hydrophobic" structural unit, on the other hand, the dispersant cannot form any network structure so that a sol structure such as that described above cannot be formed. Penetration of the ink into paper fibers thus takes place. As a consequence, the pigment is not considered to remain sufficiently on the surface of the recording medium, thereby failing to obtain any sufficient color producing property.

Concerning hydrophilic compounds useful in the present invention, each of said hydrophilic compound having at least one structural unit of "hydrophobic molecular chain-hydrophilic molecular chain-hydrophobic molecular chain-hydrophilic molecular chain" in its molecular structure, a specific description will be made of their synthesis processes and illustrative compounds although they also include known hydrophilic compounds having one or more of the structural unit.

As the synthesis processes of the hydrophilic compounds, the following processes can be mentioned by way of example:

(1) A synthesis process in which with a water-soluble compound containing two or more reactive groups, a hydrophobic compound having a group reactive with the reactive groups is reacted.

(2) A synthesis process in which molecules of a water-soluble compound having a bond of hydrophobic molecular chain-hydrophilic molecular chain and having one or more reactive groups are coupled by a polyfunctional compound.

(3) A synthesis process in which a hydrophilic molecular chain is bonded to a hydrophobic molecular chain and further, a compound having a hydrophobic molecular chain is reacted.

Examples of water-soluble compounds, which are useful in the above-described synthesis process (1) and contain two or more hydroxyl groups or amino groups as reactive groups, can include polyethylene glycol, oxyethylene-oxypropylene random copolymer, polyoxyethylene-polyoxypropylene block copolymer, polyoxyethylene-polyoxypropylene-polyoxyethylene block copolymer, polyethylene oxide-polypropylene oxide-ethylenediamine-polyoxypropylene-polyoxyethylene block copolymer, polyoxyethylenediamine, polyvinyl alcohol, and methoxypolyethylene oxide methacrylate-hydroxyethyl methacrylate copolymer. Examples of hydrophobic compounds to be reacted with such water-soluble compounds can include long-chain fatty acids such as stearic acid, isostearic acid, oleic acid and behenic acid; carboxylic acids such as 2-naphthoic acid and N-(1-naphthyl) 1,8-naphthalic acid imide; stearyl isocyanate; and 1-naphthyl isocyanate.

Examples of water-soluble compounds, which are useful in the above-described synthesis process (2) and contain a bond of hydrophobic molecular chain-hydrophilic molecular chain and one or more reactive groups, can include polyoxyethylene cetyl ether, polyoxyethylene stearyl ether, polyoxyethylene oleyl ether, polyoxyethylene behenyl ether, polyoxyethylene octylphenyl ether, polyoxyethylene phytosterol ether, polyoxyethylene-polyoxypropylene-cetyl ether, polyoxyethylene-polyoxypropylene-decyltetradecyl ether, polyethylene glycolmonostearate, polyethylene glycol monoisostearate, polyethylene glycol monobehenate, and polyethylene glycol monooleate.

Examples of polyfunctional compounds for coupling molecules of such water-soluble compounds can include polycarboxylic acids such as malonic acid, maleic acid, succinic acid, adipic acid, butanetetracarboxylic acid, phthalic acid, isophthalic acid, trimellitic acid and pyromellitic acid, and their anhydrides, acid halides and lower alcohol esters; and polyisocyanates such as hexamethylene duisocyanate, isophorone diisocyanate, tolylene diisocyanate, and adducts of such diisocyanates with trimethylol propane or pentaerythritol.

With half esters of acid anhydrides, such as the sulfophthalate diesters of the above-described hydrophilic compounds containing one hydroxyl group and the diesters of the above-described hydrophilic compounds containing one hydroxyl group with butanetetracarboxylic acid anhydride or pyromellitic acid anhydride, hydrophilic compounds with anionic hydrophilic groups introduced therein are synthesized.

Compounds each of which is useful in the above-described synthesis process (3) and contains a hydrophobic molecular chain and a hydrophilic molecular chain bonded with each other are such water-soluble compounds as mentioned above in connection with the synthesis process (2). Further, compounds which are reacted with such water-soluble compounds and contain hydrophobic molecular chains, respectively, are such reactive hydrophobic compounds as mentioned above in connection with the synthesis process (1).

Illustrative of hydrophilic compounds available by the process (1) are polyethylene glycol (molecularweight: approx. 6,000) distearate, polyethylene glycol (molecular weight: approx. 6,000) dioleate, oxyethylene-oxypropylene (weight ratio: 75:25) random copolymer (molecular weight: approx. 13,000) dibehenate, polyethylene glycol (molecular weight: approx. 10,500) di(2-naphthoate), polyethylene glycol (molecular weight: approx. 10,500) di(N-(1-naphthyl) phthalamate, and polyethylene glycol (molecular weight: approx. 6,000) distearylurethane.

Illustrative of hydrophilic compounds available by the process (2) are polyethyleneglycol (molecularweight: approx. 2,200) stearyl ether di(butanetetracarboxylate), polyethylene glycol (molecular weight: approx. 6,000) behenyl ether di(butanetetracarboxylate), polyethylene glycol (molecular weight: approx. 4,000) octylphenyl ether di(butanetetracarboxylate), a reaction product between polyethylene glycol (molecular weight: approx. 1,800) cetyl ether and hexamethylene diisocyanate, a reaction product between polyethylene glycol (molecular weight: approx. 1,300) cetyl ether and tetramethylxylylene diisocyanate, a reaction product between polyethylene glycol (molecular weight: approx. 6,000) oleyl ether and trimethyhexamethylene diisocyanate, a reaction product between polyethylene glycol (molecular weight: approx. 2,200) oleyl ether and isocyanatoethyl 2,6-diisocyanatocaproate, a reaction product between polyethylene glycol (molecular weight: approx. 2,200) oleyl ether and isocyanatoethyl 2,6-diisocyanatocaproate-ethylene glycol (molar ratio: 2:1) urethane compound, a reaction product between a polyoxyethylene-polyoxypropylene-polyoxyethylene block copolymer (molecular weight: approx. 16,000) and hexamethylene diisocyanate, and a reaction product between a polyoxyethylene-polyoxypropylene-ethylenediamine-polyoxypropylene-polyoxyethylene block copolymer (molecular weight: approx. 16,000) and 1-naphthyl isocyanate.

Further, illustrative of hydrophilic compounds with an anionic hydrophilic-group introduced therein are polyethylene glycol (molecular weight: approx. 10,000) stearyl ether di(pyromellitate) and sodium polyethylene glycol (molecular weight: approx. 10,000) stearyl ether di(sulfophthalate). Illustrative of hydrophilic compounds available by the process (3) are polyethylene glycol (molecular weight: approx. 6,000) stearyl ether stearate, a reaction product between polyethylene glycol (molecular weight: approx. 6,000) stearyl ether and stearylurethane, polyethylene glycol (molecular weight: approx. 6,000) behenyl ether behenate, a reaction product between polyethylene glycol (molecular weight: approx. 6,000) cetyl ether and stearylurethane, and a reaction product between polyethylene glycol (molecular weight: approx. 10,000) oleyl ether and stearylurethane. Incidentally, the above-described molecular weights are weight average molecular weights, respectively (this will apply equally hereinafter).

The content of the hydrophilic compound in the ink can range, for example, from 0.05 to 5 wt. %, preferably from 0.1 to 2 wt. % based on the whole ink composition. A content lower than 0.05 wt. % may be difficult to bring about the advantageous effects of the present invention to maximum extent in some instances, while a content higher than 5 wt. % leads to an increase in ink viscosity and may make its jetting difficult as an ink-jet ink in some instances.

The hydrophilic compound can be added together with the dispersant in a pigment-dispersing step, or can be added as a mixture with a diluent upon preparation of the ink by diluting a pigment dispersion. In view of operational ease and economy, however, it is desired to add the hydrophilic compound upon preparation of the ink.

As the pigment for use in the present invention, one or more of organic pigments, inorganic pigment, disperse pigments and the like, which have been used to date, can be used in a similar manner as in the conventional art. Illustrative are carbon black pigment, quinacridone pigments, phthalocyanine pigments, benzimidazolone pigments, isoindolinone pigments, and azo pigments.

More specifically, usable examples can include conventional pigments such as insoluble azo pigments such as toluidine red, toluidine maroon, Hansa yellow, benzidine yellow and pyrazolone red; soluble azo pigments such as lithol red, helio bordeaux, pigment scarlet and permanent red 2B; phthalocyanine pigments such as phthalocyanine blue and phthalocyanine green; quinacridone pigments such as quinacridone red and quinacridone magenta; perylene pigments such as perylene red and perylene scarlet; isoindolinone pigments such as isoindolinone yellow and isoindolinone orange; pyranthrone pigments such as pyranthrone red and pyranthrone orange; thioindigo pigments; condensed azo pigments; benzimidazolone pigments; quinophthalone yellow; nickel azo yellow; perinone orange; anthrone orange; dianthraquinonyl red; and dioxazine violet. The pigment can be used in either a dry state or a wet state.

The content of the pigment in the ink according to the present invention can range, for example, from 1 to 10 wt. %, preferably from 3 to 8 wt. % based on the whole ink composition. This range can provide the ink with full satisfaction in chroma, produced color density and scuff fastness, and also with full satisfaction in viscosity and storage stability.

Usable examples of the hydrophilic dispersant for use in the present invention can include known alkali-soluble resins useful in water-based pigment inks. A preferred alkali-soluble resin acts not only as a pigment dispersant but also as a binder, and serves to maintain the dispersion stability of pigment particles dispersed in a dispersion or an ink and also to fix pigment particles deposited on a recording medium.

No particular limitation is imposed on the dispersant insofar as it is a resin soluble in an aqueous solution in which an alkali is dissolved. Nonetheless, use of a resin having the weight average molecular weight is 50,000 or lower, preferably 40,000 or lower is preferred from the standpoint of the dispersion stability of the pigment. More specific examples can include random copolymers, graft copolymers, block copolymers and the like, each of which is composed of at least two monomers selected from styrene derivatives such as styrene and $\alpha$-methylstyrene, vinylnaphthalene derivatives, esters of $\alpha,\beta$-ethylenically unsaturated carboxylic acids with aliphatic, alicyclic or aromatic alcohols, (meth) acrylic acid, and alkyl (meth)acrylate derivatives.

Examples of the alkyl (meth)acrylate derivatives can include methyl (meth)acrylate, ethyl (meth)acrylate, propyl (meth)acrylate, isopropyl (meth)acrylate, n-butyl (meth) acrylate, sec-butyl (meth)acrylate, tert-butyl (meth)acrylate, 2-methylbutyl (meth)acrylate, 2-ethylbutyl (meth)acrylate, 3-methylbutyl (meth)acrylate, 1,3-dimethylbutyl (meth) acrylate, pentyl (meth)acrylate, 3-pentyl (meth)acrylate, hexyl (meth)acrylate, 2-ethylhexyl (meth)acrylate, heptyl (meth)acrylate, octyl (meth)acrylate, nonyl (meth)acrylate, 2-ethoxyethyl acrylate, 3-ethoxypropyl acrylate, 2-ethoxybutyl acrylate, 3-ethoxybutyl acrylate, and dimethylaminoethyl acrylate. On the other hand, examples of the esters of $\alpha,\beta$-ethylenically unsaturated carboxylic acids with aliphatic, alicyclic or aromatic alcohols can include diesters and half esters of unsaturated dibasic acids, such as maleic acid, fumaric acid and itaconic acid, with aliphatic, alicyclic or aromatic alcohols having 1 to 18 carbon atoms. Further, optionally usable monomers can include (meth)acrylamide, N-methylol (meth)acrylamide, diacetone acrylamide, and the like.

Although no particular limitation is imposed on the alkali agent employed to solubilize the dispersant resin in the aqueous medium, a compound selected, for example, from the group consisting of ammonia, primary, secondary and tertiary organic amines (including basic, nitrogen-containing heterocyclic compounds) and alkali metal hydroxides is suitably usable. The content of such an alkali agent in the ink may range preferably from 5 to 100 wt. %, more preferably from 8 to 50 wt. % based on the pigment.

The aqueous medium for use in the present invention can preferably be a mixed solvent of water and a water-miscible organic solvent. As the water, use of deionized water is preferred. The content of water in the ink may range generally from 10 to 70 wt. %, with a range of 20 to 50 wt. % being preferred.

Examples of the water-miscible organic solvent can include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; alkylene glycols containing 2 to 6 carbon atoms per alkylene group, such as ethylene glycol, propylene glycol, butylene glycol, triethylene glycol, 1,2,6-hexanetriol, thiodiglycol, hexylene glycol and diethylene glycol; lower alkyl ethers of polyhydric alcohols, such as glycerin, ethylene glycol monomethyl(or ethyl) ether, diethylene glycol methyl (or ethyl) ether, triethylene glycol monomethyl ether, triethylene glycol monoethyl ether and triethylene glycol monobutyl ether; N-methyl-2-pyrrolidone; 2-pyrrolidone; and 1,3-dimethyl-2-imidazolidinone.

To formulate the ink of the present invention into an ink having desired physical values, one or more of other surfactants, defoamers, preservatives and the like can be incorporated as needed in addition to the above-described components. Further, the ink according to the present invention can also contain urea, thiourea, ethylene urea or a derivative thereof as a nozzle drying inhibitor.

Any disperser can be used as a pigment disperser upon preparation of the ink insofar as it is commonly employed. It is a representative process to perform dispersion in a known disperser, for example, a vertical bead mill such as a ball mill or sand mill, a horizontal bead mill such as DYNOMIL (trade mark for a high-speed bead mill), a roll mill or an ultrasonic mill.

In the present invention, the desired dispersed particle size of the pigment can be 150 nm or smaller in terms of average particle size in view of color developing properties of ink, such as optical density and chroma, print quality, and the settling of the pigment in the ink. To obtain a pigment dispersion having a desired particle size distribution, the following approaches are employed: to reduce the size of a grinding medium for a disperser, to increase the packing rate of the grinding medium, to make the processing time longer, to make the discharge rate slower, and to conduct classification by a filter, a centrifugator or the like after grinding. Two or more of these approaches can be used in combination. As a still further approach, it is also possible to use a pigment the primary particle size has been rendered smaller beforehand by a known method, for example, salt milling.

The water-based pigment ink according to the present invention is excellent in color developing properties such as color density and chroma and superb in print quality, and is suited for ink-jet recording which performs recording by causing ink droplets to fly from a printer head. It is also suited as a printing ink such as a water-based gravure ink or water-based flexographic ink, as a colorant for paper, or as a water-based colorant such as a textile printing agent for woven fabric.

EXAMPLES

The present invention will next be described in more specifically based on specific examples and comparative examples, in which all the designations of "part" or "parts" and "%" are on a weight basis unless otherwise specifically indicated.

Example 1

(a) Preparation of a Pigment Dispersion

As a pigment dispersant solution, an aqueous resin solution was prepared by mixing a styrene-methacrylic acid-alkyl methacrylate copolymer resin (acid value: 97, weight average molecular weight: approx. 32,000; 100 parts) with butyl cellosolve (50 parts), butyl carbitol (50 parts), sodium hydroxide (7 parts) and water (143 parts) and then heating and dissolving the resultant mixture at 80° C. for 5 hours. Using dimethylquinacridone pigment (C.I.Pig.Red 122), a red pigment dispersion was prepared in a manner to be described below.

| | |
|---|---|
| Dimethylquinacridone pigment | 200 parts |
| Dispersant solution obtained as described above | 110 parts |
| Deionized water | 390 parts |
| | 700 parts |

The above-described materials were combined and stirred for 2 hours in a dissolver. After confirming that aggregates of the pigment were no longer contained, dispersing processing was conducted at a circumferential speed of 14 m/s by using a horizontal disperser with a tumbling medium contained therein, "DYNOMIL 1.4 L ECM Model" [trade name; manufactured by Shinmaru Enterprises Corporation; zirconia beads (diameter: 0.65 mm)]. The dispersing processing was finished after the it had been conducted for 3 hours.

To the resulting mill base (600 parts), deionized water (540 parts) was added, followed by thorough stirring to form a uniform dispersion. The dispersion was subjected to centrifugation (12,000 rpm, 20 minutes) to obtain a pigment dispersion the pigment content of which was 15%. The pigment dispersion was analyzed for its average particle size by a particle size measuring instrument, "Model N4" (trade name; manufactured by Coulter Electronics, Inc.). The average particle size was determined to be 125 nm.

(b) Preparation of an Ink for Ink-Jet Printers

Added to the above-described pigment dispersion (40 parts) was a liquid mixture (60 parts) consisting of triethylene glycol monobutyl ether (5 parts), glycerin (5 parts), "SURFYNOL 465" (trade name; product of Air Products and Chemicals, Inc.; 0.5 part), water (48.2 parts), methanol (0.5 part) and polyethylene glycol (weight average molecular weight: approx. 6,000) distearate (0.8 part). Subsequent to thorough stirring, the mixture was filtered through a membrane filter of 5 μm pore size to obtain a magenta ink for ink-jet printers.

Example 2

A magenta ink for ink-jet printers was obtained in a similar manner as in Example 1 except that a reaction product between polyethylene glycol (molecular weight: approx. 2,200) oleyl ether and trimethylhexamethylene diisocyanate was used in an amount of 0.5 part in place of polyethylene glycol (weight average molecular weight: approx. 6,000) distearate.

Comparative Example 1

Following the procedure of Example 1, a magenta ink free of polyethylene glycol distearate was prepared.

Comparative Example 2

A magenta ink was prepared in a similar manner as in Example 1 except that polyethylene glycol (weight average molecular weight: approx. 6,000) monostearate (0.5 part) was used in place of polyethylene glycol distearate.

Example 3

(a) Preparation of a Pigment Dispersion

Using an insoluble yellow azo pigment (C.I.Pig.Yellow 74), a yellow pigment dispersion was prepared.

| | |
|---|---|
| Insoluble yellow azo pigment | 200 parts |
| Dispersant solution prepared in Example 1 | 140 parts |
| Ethylene glycol | 65 parts |
| Deionized water | 245 parts |
| | 650 parts |

In a similar manner as in Example 1(a), the above-described materials were combined and stirred in a dissolver and then subjected to dispersing processing for 4 hours in "DYNOMIL 1.4 L ECM Model". To the resulting mill base (600 parts), deionized water (620 parts) was added, followed by thorough stirring to form a uniform dispersion. The dispersion was subjected to centrifugation to obtain a yellow pigment dispersion the pigment content of which was 15%. The pigment dispersion was analyzed for its average particle size by the particle size measuring instrument, "Model N4". The average particle size was determined to be 120 nm.

(b) Preparation of an Ink for Ink-Jet Printers

In a similar manner as in Example 1(b), added to the above-obtained, yellow pigment dispersion (40 parts) was a liquid mixture (60 parts) consisting of triethylene glycol butyl ether (5 parts), glycerin (10 parts), "SURFYNOL 465" (trade name; product of Air Products and Chemicals, Inc.; 0.5 part), water (43.2 parts), methanol (0.5 part) and a reaction product (0.8 part) between polyethylene glycol (weight average molecular weight: approx. 2,200) oleyl ether and isocyanatoethyl 2,6-diisocyanatocaproate. Subsequent to thorough stirring, the mixture was filtered through a membrane filter of 5 μm pore size to obtain a yellow ink for ink-jet printers.

Comparative Example 3

Following the procedure of Example 3, a yellow ink free of polyethylene glycol distearate was prepared.

Comparative Example 4

A yellow ink was prepared in a similar manner as in Example 3 except that polyethylene glycol (weight average molecular weight: approx. 6,000) monostearate (0.5 part) was used in place of polyethylene glycol distearate.

Example 4

(a) Preparation of a Pigment Dispersion

Using a phthalocyanine blue pigment (C.I.Pig.Blue 15:3), a blue pigment dispersion was prepared.

| | |
|---|---|
| Phthalocyanin blue pigment | 200 parts |
| Dispersant solution prepared in Example 1 | 110 parts |
| Ethylene glycol | 70 parts |
| Deionized water | 320 parts |
| | 700 parts |

In a similar manner as in Example 1(a), the above-described materials were combined and stirred in a dissolver and then subjected to dispersing processing for 2 hours in "DYNOMIL 1.4 L ECM Model". To the resulting mill base (600 parts), deionized water (530 parts) was added, followed by thorough stirring to form a uniform dispersion. The dispersion was subjected to centrifugation to obtain a blue pigment dispersion the pigment content of which was 15%. The pigment dispersion was analyzed for its average particle size by the particle size measuring instrument, "Model N4". The average particle size was determined to be 125 nm.

(b) Preparation of an Ink for Ink-Jet Printers

In a similar manner as in Example 1(b), added to the above-obtained, blue pigment dispersion (40 parts) was a liquid mixture (60 parts) consisting of isopropyl alcohol (5 parts), glycerin (15 parts), "SURFYNOL 465" (trade name; product of Air Products and Chemicals, Inc.; 1.0 part), water (38.4 parts) and a reaction product (0.6 part) between polyethylene glycol (weight average molecular weight: approx. 1,300) cetyl ether and tetramethylxylylene diisocyanate. Subsequent to thorough stirring, the mixture was filtered through a membrane filter of 5 μm pore size to obtain a cyan ink for ink-jet printers.

Comparative Example 3

Following the procedure of Example 4, a cyan ink free of polyethylene glycol distearate was prepared.

Evaluation/Ranking of the Inks for Ink-Jet Printers

The average particle sizes of the pigments dispersed in the pigment inks obtained in the Examples and Comparative Examples and suited for use with ink-let printers are shown in Table 1. The inks obtained in the Examples and Comparative Examples were separately filled in ink cartridges, and solid printing was performed on plain paper ("Xerox 4024", trade name; product of Fuji Xerox Co., Ltd.) by an ink-let printer ("PICTY 400", trade name; manufactured by NEC Corporation). After left over for one day in a room, the optical densities of the plain paper prints were measured by "Macbeth RD-914", trade name; manufactured by Macbeth AG). The plain paper prints were also measured by a chromatic meter ("CR-321", trade name; manufactured by Minolta Camera Co., Ltd.), and from their a* values and b* values, their chroma values c* were calculated. Further, vertical andhorizontal, straight lines were printed. Their print definitions were visually observed to rank the prints in quality. The evaluation/ranking results are shown below in Table 1.

TABLE 1

| | Average particle size (nm) | Optical density | Chroma | Print definition |
|---|---|---|---|---|
| Ex. 1 | 120 | 1.38 | 60.4 | B |
| Ex. 2 | 122 | 1.34 | 59.4 | B |
| Comp. Ex. 1 | 122 | 1.19 | 56.5 | B |
| Comp. Ex. 2 | 123 | 1.09 | 53.9 | B |
| Ex. 3 | 117 | 1.10 | 85.7 | B |
| Comp. Ex. 3 | 118 | 1.05 | 85.5 | B |
| Comp. Ex. 4 | 120 | 1.04 | 85.5 | B |
| Ex. 4 | 124 | 1.16 | 45.1 | B |
| Comp. Ex. 5 | 125 | 1.07 | 40.2 | B |

Ranking of print definition:
A: Excellent
B: Good
C: Poor

As is evident from Table 1, the inks of Examples 1 and 2 provided high optical density and chroma and also excellent print quality. With the ink of Comparative Example 1, which did not contain any "A-B-A" type hydrophilic compound, and the ink of Comparative Example 2, which used the nonionic surfactant of the alkyl monoester type, neither density nor chroma were sufficient. Similar advantageous effects are also evident with respect to the yellow and cyan inks of Examples 3 and 4. It is, therefore, appreciated that inks according to the present invention are good in chroma and density and excellent in print quality on plain paper.

INDUSTRIAL APPLICABILITY

The present invention can provide water-based pigment inks good in chroma and density and excellent in print quality on plain paper.

The invention claimed is:

1. A water-based pigment ink, comprising:
   a pigment;
   a hydrophilic dispersant;
   an aqueous medium;
   an alkali agent for solubilizing said hydrophilic dispersant in said aqueous medium; and
   a hydrophilic compound having only one structural unit of "hydrophobic molecular chain-hydrophilic molecular chain-hydrophobic molecular chain" in a structure thereof;
   wherein said hydrophilic compound is at least one compound selected from the group consisting of a reaction product between polyethylene glycol cetyl ether and hexamethylene diisocyanate; a reaction product between polyethylene glycol cetyl ether and tetramethylxylylene diisocyanate; a reaction product between polyethylene glycol oleyl ether and trimethyhexamethylene diisocyanate; a reaction product between polyethylene glycol oleyl ether and isocyanatoethyl 2,6-diisocyanatocaproate; a reaction product between polyethylene glycol oleyl ether and isocyanatoethyl 2,6-diisocyanatocaproate-ethylene glycol (molar ratio 2:1) urethane compound; a reaction product between a polyoxyethylene-polyoxypropylene-polyoxyethylene block copolymer and hexamethylene diisocyanate; and a reaction product between a polyoxyethylene-polyoxypropylene-ethylenediamine-polyoxypropylene-polyoxyethylene block copolymer and 1-naphthyl isocyanate.

2. The water-based pigment ink according to claim 1, wherein a content of said hydrophilic compound ranges from 0.1 to 2 wt. % based on a total amount of components of said ink.

3. The water-based pigment ink according to claim 1, wherein said alkali agent is a compound selected from the group consisting of ammonia, primary, secondary and tertiary organic amines, and alkali metal hydroxides.

4. The water-based pigment ink according to claim 1, which is for use in ink-jet recording.

5. A image recording method water-based pigment ink according to claim 1, which is used for recording an image.

6. A image recording system which comprises a water-based pigment ink according to claim 1, wherein said water-based pigment ink is loaded on said image recording system.

7. The image recording system according to claim 6, which is an aqueous ink-jet printer.

8. The water-based pigment ink according to claim 1, wherein a content of said hydrophilic compound ranges from 0.05 to 5 wt. % based on a total amount of components of said ink.

9. The water-based pigment ink according to claim 1, wherein a content of said pigment ranges from 1 to 10 wt. % based on a total amount of components of said ink.

10. The water-based pigment ink according to claim 1, wherein a content of said pigment ranges from 3 to 8 wt. % based on a total amount of components of said ink.

11. The water-based pigment ink according to claim 1, wherein a content of said alkali agent ranges from 5 to 100 wt. % based on an amount of said pigment.

12. The water-based pigment ink according to claim 1, wherein a content of said alkali agent ranges from 8 to 50 wt. % based on an amount of said pigment.

13. The water-based pigment ink according to claim 1, wherein said aqueous medium is a mixed solvent of water and a water-miscible organic solvent.

14. The water-based pigment ink according to claim 1, wherein said water-miscible organic solvent is selected from the group consisting of alkyl alcohols having 1 to 4 carbon atoms; alkylene glycols having 2 to 6 carbon atoms per alkylene group; lower alkyl ethers of polyhydric alcohols; N-methyl-2-pyrrolidone; 2-pyrrolidone; and 1,3-dimethyl-2-imidazolidinone.

15. The water-based pigment ink according to claim 13, wherein a content of said water ranges from 10 to 70 wt. %.

16. The water-based pigment ink according to claim 13, wherein a content of said water ranges from 20 to 50 wt. %.

* * * * *